May 15, 1923.                                              1,455,361
J. F. SIPE
SOLID ELASTIC TIRE FOR ROAD VEHICLES
Filed Jan. 2, 1923
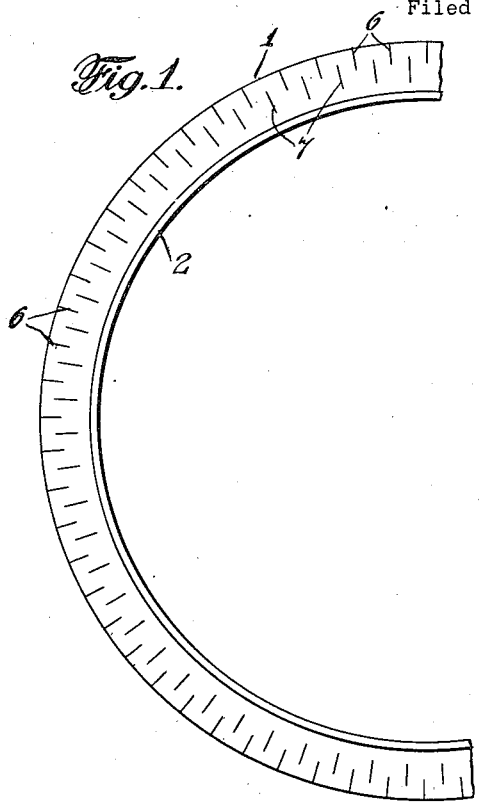
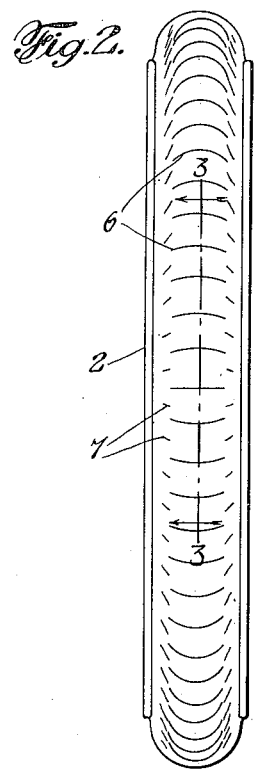
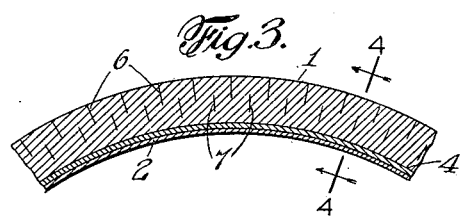
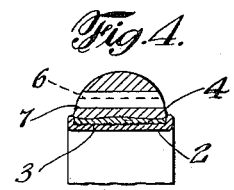
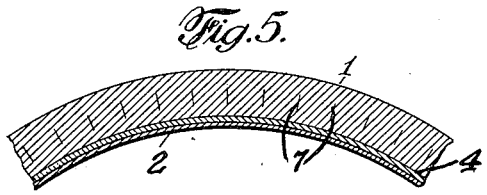
INVENTOR
John F. Sipe
BY HIS ATTORNEY Patented May 15, 1923.

1,455,361

UNITED STATES PATENT OFFICE.

JOHN F. SIPE, OF NEW YORK, N. Y.

SOLID ELASTIC TIRE FOR ROAD VEHICLES.

Application filed January 2, 1923. Serial No. 610,090.

*To all whom it may concern:*

Be it known that I, JOHN F. SIPE, a citizen of the United States, and resident of New York city, in the county and State of New York, have invented certain new and useful Improvements in Solid Elastic Tires for Road Vehicles, of which the following is a specification.

My invention relates to solid elastic tires for road vehicles and has for its object the provision of a solid tire having improved cushioning and elastic qualities and a longer life than ordinary solid elastic tires.

In my co-pending application, Serial #421,223, filed Nov. 2, 1920, I have shown and described a solid tire having a tread portion provided by a multiplicity of radial cuts or incisions which form sections normally in contact with each other, there being little or no material removed. This tire is one which has much improved cushioning and gripping or non-skid qualities and the tire has a greatly lengthened life because the yielding of the various tread sections reduces the wear of the tire, and also because the heating of the tire is very much lessened because of the reducing of the traction wave within the tire by reason of the divided tread.

In accordance with my present invention, a multiplicity of radial cuts or incisions are made in the solid tire entirely below the surface thereof, and I have found that by this means the cushioning qualities of the tire are much improved and the traction wave is very much reduced. These cuts or incisions are made by inserting a knife or saw into one or both sides of the tire, but preferably from one side of the tire entirely through the same. These internal cuts or incisions may be applied to any of the standard solid tires in use, such as tires having smooth exterior surfaces or tires formed with irregular surfaces by molding or otherwise, and the result will be a tire having improved cushioning qualities and one in which heating, because of traction wave, will be substantially lessened, so that the life of the tire is lengthened because of these cuts or incisions. I prefer, however, to embody my invention in a tire having the tread portion also divided by cuts or incisions, in accordance with my said co-pending application. In this case, the cuts or incisions made in accordance with my present invention will preferably be arranged with staggered relation to the cuts or incisions dividing the tread portion and will be arranged at such depth that when the tire has become worn to such a point that the outer cuts or incisions are no longer effective, the inner row of cuts or incisions become exposed and perform the function of dividing the tread section as it originally was done by the outer row of cuts or incisions.

For a better understanding of the above indicated features of my invention and others which will hereinafter appear, reference may be had to the accompanying drawings forming a part of this application wherein Fig. 1 is a side view of a tire having the divided tread portion of my said co-pending application and embodying my invention.

Fig. 2 is a plan view thereof;

Fig. 3 is a sectional view along the lines 3—3 of Fig. 2;

Fig. 4 is a cross section of the tire; and

Fig. 5 is a sectional view similar to Fig. 3 of a tire having a smooth and undivided outer surface and embodying my invention.

Referring to the drawings where like numerals designate similar parts throughout, I have illustrated in the particular instance shown my invention applied or incorporated into a solid tire 1 which is molded into a rim 2 by vulcanizing under high pressure. The inner surface or channel 3 of the ring 2 may be provided with a suitable roughened surface as, for example, serrations for the purpose of facilitating the molding of the tire 1 thereon. The innermost portion 4 of the tire is preferably of rubber of a much harder and less elastic character than the outer portion.

Figs. 1–4 represent the tread sections formed by the cuts or incisions 6, in accordance with my said co-pending application. At 7 I show the sub-surface cuts or incisions constituting my present invention. These may be formed in any suitable manner and may extend partly or wholly through the tire. I prefer to form them entirely through the tire by forcing a sharp knife through the tire from one side thereof. It will be noted that the outer ends of the divisions 7 extend outwardly a little beyond the inner ends of the divisions 6 and that the inner ends of the divisions 7 stop at points a substantial distance from the rim 2, thus leaving an undivided base for the tire. With this precise arrangement it will be seen that the original tire has not only all the advantages of the tire of my said co-pending application, but that, in addition, it has, first, an additional cushioning and an additional breaking up of the rubber to eliminate the traction wave and its consequent heating, and, second, that after the tire has become worn the sub-surface cuts or incisions become surface cuts or incisions and form a new divided tread without the necessity of bringing the tire back to the shop for this purpose.

In Fig. 5 I show the same sub-surface cuts or incisions applied to a tire having ordinary smooth surfaces. It will be understood from what has been said that the tire is improved by these sub-surface cuts or incisions, but, as I am now advised, is inferior to the tire shown in Fig. 1. However, it should be noted that whenever the tire wears to a point that will expose the outer ends of the cuts or incisions, there will, if the cuts are suitably arranged, then be formed the tire of my said co-pending application.

The sub-surface cuts or incisions 7 may be formed in an endless variety of ways without departing from my invention, provided that a multiplicity of them are formed around the tire so as to obtain improved results because of the dividing up of the solid tire to produce a multiplicity of contiguous radial surfaces.

Having thus described my invention, what I desire to secure and obtain by Letters Patent is:

1. A solid elastic tire provided with a multiplicity of radial cuts or incisions all around the tire and beneath the tread surface thereof.

2. A solid elastic tire provided with a multiplicity of radial cuts or incisions all around the tire and beneath the tread surface thereof, the cuts or incisions extending outwardly far enough to divide the tire into tread sections after its original tread portion has worn off.

3. A solid elastic tire mounted in a rim and provided with a multiplicity of radial cuts or incisions all around the tire beneath the tread surface thereof and such distance from the rim as to leave a substantial undivided elastic base portion.

4. A solid elastic tire mounted in a rim and provided with a multiplicity of radial cuts or incisions all around the tire, said cuts or incisions extending outwardly into but not through the normal wearing portion of the tire, a substantial elastic base portion of the tire being left uncut.

5. A solid elastic tire having its peripheral tread portion formed with a multiplicity of relatively movable cushioning sections and a plurality of radial cuts or incisions in the tire, wholly beneath the original surface thereof.

6. A sold elastic tire having its peripheral tread portion formed with a multiplicity of relatively movable cushioning sections and a plurality of radial cuts or incisions in the tire wholly beneath the original surface thereof, and forming a renewed divided tread portion after the original divided tread has sufficiently worn down.

7. A solid elastic tire having its peripheral tread portion formed with a multiplicity of relatively movable substantially in contact cushioning and gripping sections and having a multiplicity of transverse cuts or incisions through the main body thereof beginning at a point above the base portion of the tire, extending radially outwardly and terminating in said relatively movable sections.

8. A solid elastic tire having its peripheral tread portion provided with a multiplicity of transverse divisions of the tread into a series of circumferentially disposed projections, and having a plurality of radial cuts or incisions extending through the main body of the tire below the original surface of the tire and above its base, said cuts or incisions being staggered with relation to the peripheral divisions.

9. A solid elastic tire having its peripheral tread portion provided with a multiplicity of transverse divisions of the tread into a series of circumferentially disposed projections, and having a plurality of transverse divisions extending through the main body of the tire below the original surface of the tire and above its base, said divisions being staggered with relation to said grooves and overlapping the same.

10. A solid elastic tire having its peripheral tread section formed with a multiplicity of transverse radially extending cuts or incisions forming tread sections normally in contact with each other and having a multiplicity of additional transverse radially extending cuts or incisions through the main body of the tire, said last-named cuts or incisions being disposed in staggered relation to and overlapping the first named cuts and incisions.

In testimony whereof, I have signed my name to this specification.

JOHN F. SIPE.